United States Patent Office 3,836,685
Patented Sept. 17, 1974

3,836,685
PROCESS FOR INHIBITING FAT-CAPS IN
MEAT-IN-GRAVY PRODUCTS
Robert E. Schara, Myron D. Shoaf, and Charles P. Berry, Battle Creek, Mich., assignors to General Foods Corporation, White Plains, N.Y.
No Drawing. Filed Sept. 15, 1972, Ser. No. 289,706
Int. Cl. A23l 1/31, 3/10
U.S. Cl. 426—371　　　　　　　　　　　　　　　2 Claims

ABSTRACT OF THE DISCLOSURE

A filler material is incorporated within the meat portion of a packaged meat-in-gravy product which is retorted so as to prevent the formation of fat-caps within the packaged and retorted meat-in-gravy product.

BACKGROUND OF THE INVENTION

This invention relates to packaged meat-in-gravy food products and more particularly to the prevention of fat-cap formation within these products.

Packaged food products containing meat or meat substitutes in a gravy are known in the art and include products such as meatballs-in-gravy, meat chunks in a sauce, and the like, for either animal or human consumption. Where the meat portion of such products is a natural meat such as poultry, beef, or the like, fat is contained inherently in said meat products and is generally desirable in packaged meat-in-gravy products for nutritional purposes and for imparting a distinctive flavor and mouthful to the product. When other products, such as meat substitutes prepared from processed protein materials, having little or no inherent fat content are used, it is common to employ added fat to derive its nutritional and flavor attributes.

Such products are generally packaged in raw or partially cooked form and then cooked to their end point and sterilized by the application of heat to the sealed package using a process commonly referred to as retorting. In such a process, the fat, whether inherently contained in the meat portion or present as added fats, melts by virtue of the high temperatures to which it is subjected. As a result, the fat migrates from the meat pieces to the gravy portion of the product. Upon returning the packaged product to ambient conditions for distribution to the consumer, the melted fat returns to its solid form resulting in the formation of a "fat-cap" at the top of the package. This fat-cap, besides being unsightly and, therefore, detrimental to consumer appeal, hinders the pourability of the contents of the can, and in some cases the products must be spooned out. Even if the packaged product is to be heated by the ultimate consumer, thereby liquifying the fat, the fat will be in the gravy portion of the product as opposed to the meat pieces, resulting in a gravy of thicker viscosity than originally formulated and also meat pieces lacking the characteristic mouthfeel imparted by the fat.

Accordingly, it is an object of this invention to prevent the migration of fat from the meat portion of meat-in-gravy products which are packaged and retorted.

It is a further object to prevent the formation of fat-caps within these products.

These and other objects will be apparent upon reading the specification and claims which follow.

SUMMARY OF THE INVENTION

It has been found that the incorporation of a filler material in the meat portion of a meat-in-gravy product which is packaged and retorted, effectively prevents the formation of fat-caps within the packaged meat-in-gravy product.

The filler materials employed in the process of this invention are lipophilic materials which are preferably finely-divided. Examples of the lipophilic filler materials which may be employed in the meat piece according to the process of this invention are finely-divided siliceous materials and finely-divided cellulosic materials. The effectiveness of these materials in preventing the formation of fat-caps is realized at relatively low levels of addition and therefore do not impart any undesirable flavor or odors to the finished meat-in-gravy product. The finished meat-in-gravy products prepared in accordance with this invention display no noticeable fat-cap and are, therefore, of improved appearance, nutrition, and flavor.

DETAILED DESCRIPTION OF THE INVENTION

The process of this invention involves formulating a meat composition, shaping the composition into some desired form, mixing the composition with a gravy, packaging the meat-in-gravy product, and retorting the product. The meat composition includes a lipophilic filler material.

As used herein, the term "meat" may include meat suitable for both animal and human consumption. Therefore, depending upon the end product desired, i.e., whether intended for animal or human consumption, "meat" may include beef, pork, liver, lamb, chicken, fish, horsemeat, animal trimmings, animal by-products, and the like. A meat composition according to this invention is intended to describe compositions employing the above materials or combinations thereof and, optionally, vitamin and mineral supplements, flavorings, colorings, proteinaceous materials, fats, and other like ingredients. Meat-in-gravy products, then, are descriptive of shaped meat compositions mixed with a gravy.

In the preparation of the meat-in-gravy product, the meat and other materials are mixed in ground or comminuted form with a lipophilic filler material and shaped by some suitable method to form a meat piece. The meat may be frozen prior to being ground and may be raw or cooked. Combination of the above materials may be followed by an emulsifying step prior to shaping the meat composition into some suitable form.

The filler material employed in the meat composition in accordance with this invention has been found to substantially reduce the tendency for the fat contained in the meat piece to migrate from the piece during the retorting operation. Although the mechanism of the interaction between the filler material is not fully understood, it is believed that the filler binds up the fat in the meat piece by providing a surface upon which the fat can adhere.

To be effective, the lipophilic filler material should be finely-divided such that as great a surface area as possible is provided. Examples of fillers suitable for the purposes of this invention are siliceous materials and cellulosic materials, such as silicon dioxide, silicic acid, alkaline or alkaline earth metal silicates, cellulose fiber, microcrystalline cellulose, and the like and mixtures thereof. Farinaceous fillers such as wheat flour or cereal have been found incapable of effectively preventing the formation of fat-caps in retorted meat-in-gravy products. Similarly, proteinaceous filler materials such as finely ground caseinate are also unsatisfactory. These materials, however, may be used in combination with the non-proteinaceous and non-farinaceous filler materials of this invention.

In general the particle size of the filler material is preferably within the range of 0.001 to 20 microns in diameter, but this may vary according to the particular filler employed. The finely-divided character of the material insures its proper dispersion throughout the meat portion of the meat-in-gravy product, and also provides for a large surface area exposure to interact with the fat and thereby allow the use of relatively small amounts of the filler.

Suitable filler materials which are finely-divided are sold under the trade names "Cab-O-Sil" and "Hi-Sil" (pyrogenic silica), "Syloid," "Aerosil," 'Solka-Floc" (fibrous, finely-divided material produced from wood cellulose), and "Avicel" (microcrystalline cellulose).

The amount of the lipophilic filler material necessary to obtain the desired binding of the fat is necessarily dependent upon the desired end product, the fat content of the meat used and the amount of any additional fat employed, the severity of the heat processing conditions to which the packaged meat-in-gravy product is subjected, and the particular filler material used. Ordinarily, it has been found that levels ranging from about 0.5–4.0% by weight of the meat piece are sufficient for most meat-in-gravy products. At these levels, it is found that the filler materials do not impart any appreciable off-tastes to the finished product.

The gravies normally employed in meat-in-gravy products consist largely of water with added thickeners such as gums, starches, and mixtures thereof. Flavoring and coloring materials may also be added. Depending upon the desired finished product, the water content of the gravy is usually formulated so as to result in a predetermined viscosity value.

The meat and gravy are usually prepared separately. The meat may then be coated with the gravy or both may be added directly to the package in specified ratios. Suitable packages for such products are cans, plastic or glass containers, plastic pouches and the like which do not degrade when subjected to normal retort temperatures. The package and its contents are then subjected to a retorting step to further cook and sterilize the meat and gravy product. The packaged product is then cooled for distribution.

Retort conditions vary according to the product being so treated but normal conditions are generally of the order of exposure to 250° F. for one hour. Various retorting methods are available such as placing containers in a retort vessel employing superatmospheric pressure, and methods employing vacuum techniques.

By reducing the tendency of the fat to migrate from the formed meat piece, the meat pieces present in the gravy contain the normal flavorful and nutritional characteristics imparted by the fat. The product is of more acceptable appearance due to the elimination of the "fat-cap" at the top of the container and the meat-in-gravy product is readily pourable.

The following example is presented as illustrative of a specific embodiment of the invention.

EXAMPLE

A canned pet food and gravy product was prepared as follows:

A nutritionally balanced meat chunk for pets was prepared from 95% meat and meat by-products, 2.7% Cab-O-Sil, and 2.3% vitamins, minerals, and colorings, all percents on weight basis. The meat was comminuted using a Hobart grinder, and then mixed with the filler material and the other materials. The mixture is emulsified and then fed to a Hollymatic meat forming machine which produced meat pieces of 1 to 1⅜ inches long. The meat pieces were then pre-cooked using an infrared oven.

A gravy made from 92.5% water, 5.5% starch, 1.4% flavorings and colorings, and 0.6% fat, all percents on weight basis was then added with the meat pieces to a can in the ratio of 58% meat pieces, 42% gravy, and sealed.

The sealed product was then retorted at 250° F. for 60 minutes and then allowed to cool to room temperature. When the can was opened, no "fat-cap" was present and the product was easily pourable.

A similar product was prepared under identical conditions except that a cereal binder was used to replace the Cab-O-Sil in the meat piece. After retorting and cooling, the canned product was opened and found to have a ¼ inch "fat-cap" at the top of the can which had to be removed to render the contents of the can pourable.

The above example, as previously stated, is only one of the various applications in which the process of this invention may be employed. Variations in the specific steps, methods, and compositions disclosed may be made without departing from the scope of this invention and the appended claims.

We claim:

1. In a process for preparing a packaged meat-in-gravy product wherein a meat composition containing fat is formulated from meat, shaped, and the shaped meat composition is mixed with a liquid gravy consisting largely of water, packaged and retorted at temperatures sufficient to melt fat contained within said meat composition, the improvement comprising dispersing throughout said meat composition during the formation thereof from 0.5 to 4.0% by weight of a material selected from the group consisting of finely-divided siliceous material and finely-divided cellulosic material to prevent the formation of fat-caps in said packaged and retorted meat-in-gravy product when said product is returned to ambient conditions.

2. The process of Claim 1 wherein said siliceous material is selected from the group consisting of silicon dioxide, silicic acid, and alkaline or alkaline earth metal silicates.

References Cited

UNITED STATES PATENTS

| | | | |
|---|---|---|---|
| 3,653,908 | 4/1972 | Buck et al. | 99—7 |
| 3,632,352 | 1/1972 | Muller | 99—2 |
| 3,467,525 | 9/1969 | Hale et al. | 99—2 |
| 3,574,638 | 4/1971 | Nagel et al. | 99—107 |
| 3,692,529 | 9/1972 | Rychman | 99—2 R |
| 3,115,409 | 12/1963 | Hallinan et al. | 99—7 |
| 3,119,691 | 1/1964 | Ludington et al. | 99—2 |
| 3,574,633 | 4/1971 | Flier | 99—187 |

NORMAN YUDKOFF, Primary Examiner

C. P. RIBANDO, Assistant Examiner

U.S. Cl. X.R.

426—382, 407, 513, 131, 212